(12) United States Patent
Hoge

(10) Patent No.: US 9,774,986 B2
(45) Date of Patent: Sep. 26, 2017

(54) BLUETOOTH TAPE MEASURE SYSTEM

(71) Applicant: Charles Hoge, Baltimore, MD (US)

(72) Inventor: Charles Hoge, Baltimore, MD (US)

( * ) Notice: Subject to any disclaimer, the term of this patent is extended or adjusted under 35 U.S.C. 154(b) by 81 days.

(21) Appl. No.: 14/821,500

(22) Filed: Aug. 7, 2015

(65) Prior Publication Data

US 2016/0040971 A1 Feb. 11, 2016

Related U.S. Application Data

(60) Provisional application No. 62/034,225, filed on Aug. 7, 2014.

(51) Int. Cl.
| | | |
|---|---|---|
| *G01B 3/10* | (2006.01) | |
| *H04W 4/00* | (2009.01) | |
| *H04M 1/725* | (2006.01) | |

(52) U.S. Cl.
CPC .......... *H04W 4/008* (2013.01); *G01B 3/1084* (2013.01); *G01B 2003/1069* (2013.01); *G01B 2003/1094* (2013.01); *G01B 2210/58* (2013.01); *H04M 1/7253* (2013.01)

(58) Field of Classification Search
CPC .... G01B 2003/1069; G01B 2003/1094; G01B 2210/58
USPC .......................................... 33/759, 760, 763
See application file for complete search history.

(56) References Cited

U.S. PATENT DOCUMENTS

| | | | | | |
|---|---|---|---|---|---|
| 4,181,848 | A | * | 1/1980 | Iwase | G01B 3/1061 33/763 |
| 5,426,863 | A | * | 6/1995 | Biggel | G01B 3/1061 33/707 |
| 5,433,014 | A | * | 7/1995 | Falk | G01B 3/1061 33/755 |
| 7,992,317 | B1 | | 8/2011 | Cannata | |
| 8,356,419 | B2 | | 1/2013 | Lord | |
| 2002/0088135 | A1 | * | 7/2002 | Arlinsky | G01B 3/1041 33/760 |
| 2008/0052943 | A1 | * | 3/2008 | Brooks | G01B 3/1084 33/760 |
| 2008/0086903 | A1 | * | 4/2008 | Peterson | G01B 3/1061 33/760 |
| 2009/0307920 | A1 | | 12/2009 | Schrage | |
| 2011/0119936 | A1 | * | 5/2011 | Swanson | E04F 21/0076 33/228 |
| 2011/0131008 | A1 | * | 6/2011 | Swanson | G01B 5/004 702/152 |
| 2013/0305551 | A1 | * | 11/2013 | Jayanetti | G01B 3/1061 33/701 |

(Continued)

*Primary Examiner* — G. Bradley Bennett
(74) *Attorney, Agent, or Firm* — Baker Donelson, PC; Royal W. Craig

(57) ABSTRACT

A Bluetooth-enabled tape measuring system, a cooperating mobile or desktop application, and a method for using same. A tape measure with retractable tape stores each measurement taken and transmits the measurement to a computing device for automatic recordation and association, with the object of the measurement, which can be a user-input floor plan or the like. A software solution at the computing device is capable of planning necessary measurements, receiving transmitted measurements from the tape measure, and automatically associating received measurements with the user-input characteristics. The system may also direct the user to make certain measurements based on a user-stated project.

2 Claims, 17 Drawing Sheets

(56) References Cited

U.S. PATENT DOCUMENTS

2014/0250708 A1* 9/2014 Bauer .................. G01B 3/1061
33/760
2016/0377428 A1* 12/2016 Schubert .................. G01C 9/10
33/366.11

* cited by examiner

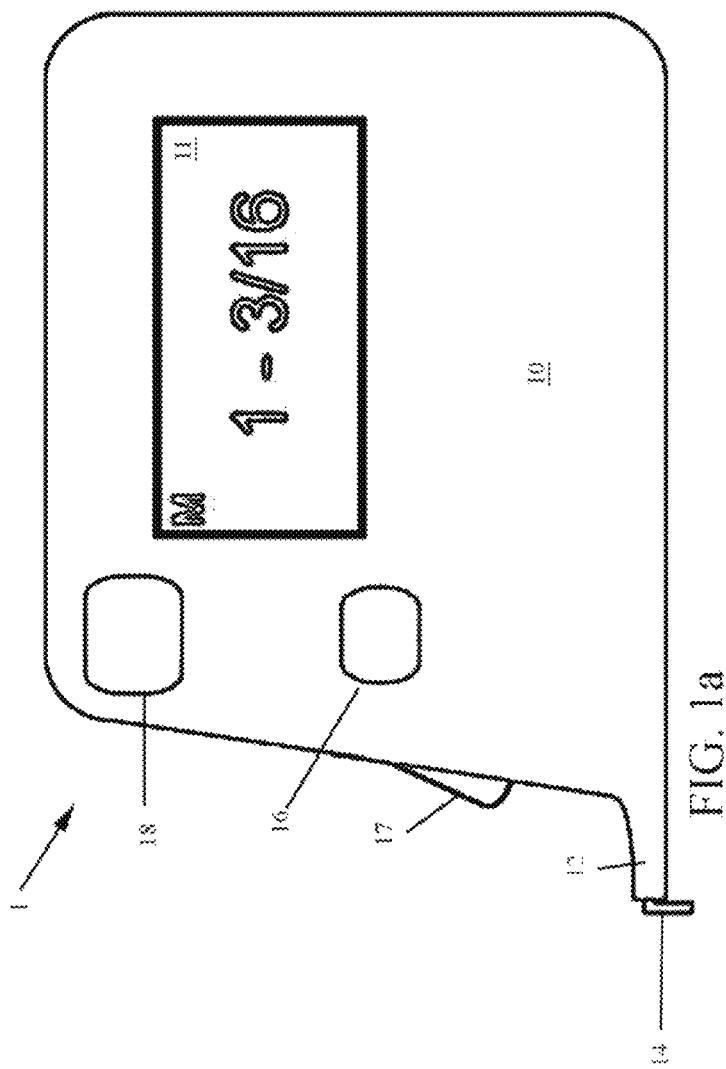
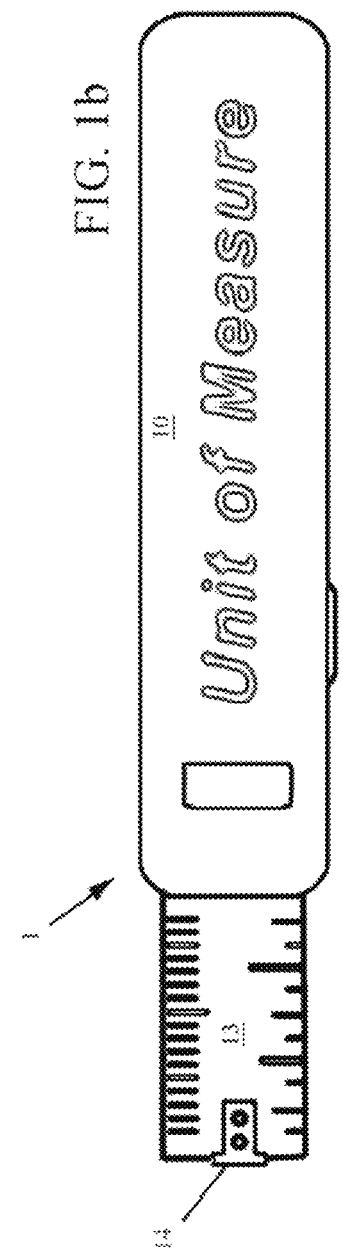

Project: Hanging a Picture or mirror
This project will guide you through the steps to determine where to place two picture hangers and mount it on the wall exactly where you want it.
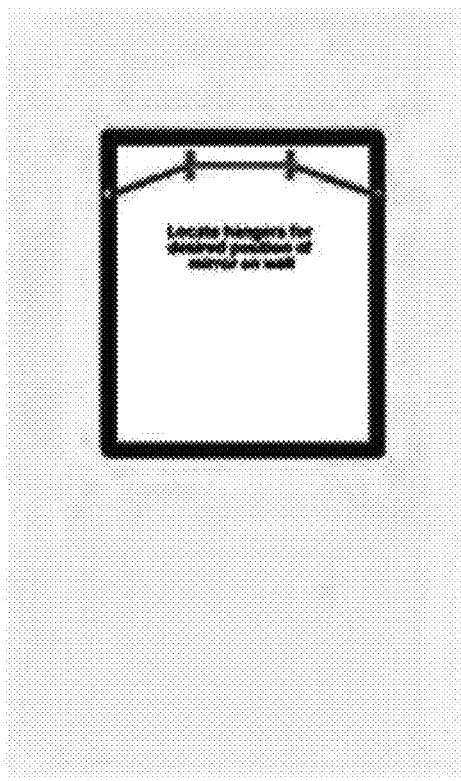
FIG. 7

Project: Hanging a Picture or mirror

Step 1: Position the picture where you want it on the wall and make a mark on the top right corner

Step 2: Select how you want the horizontal position to be. Measured from the left wall, the center of the wall or from the right wall:

| Left | Center | Right |

Step 3: Next we'll collect some measurements so that we can guide you through hanging your picture.

FIG. 8

Project: Hanging a Picture or mirror

Step 4: We are now ready to put the hooks in the wall. Please use a level if you have one to position the hook locations 1. Measure down from your mark X inches and mark this.

2. From this mark make two marks to the right at X inches and X inches. These are the marks where the bottom of the hangers will go.

3. Holding a hanger with the nail in it, place it so that the bottom is on your mark. Install here.

4. Repeat for the second hanger.

6. Hang the mirror.

FIG. 14

Project: Hanging a Picture or mirror

Step 4: We are now ready to put the hooks in the wall. Please use a level if you have one to position the hook locations 1. Measure down from your mark X inches and mark this.

2. From this mark make two marks to the right at X inches and X inches. These are the marks where the bottom of the hangers will go.

3. Holding a hanger with the nail in it, place it so that the bottom is on your mark. Install here.

4. Repeat for the second hanger.

6. Hang the mirror.

FIG. 15

Project: Hanging a Picture or mirror

Step 4: We are now ready to put the hooks in the wall. Please use a level if you have one to position the hook locations 1. Measure down from your mark X inches and mark this.

2. From this mark make two marks to the right at X inches and X inches. These are the marks where the bottom of the hangers will go.

3. Holding a hanger with the nail in it, place it so that the bottom is on your mark. Install here.

4. Repeat for the second hanger.

5. Hang the mirror.

FIG. 16

BLUETOOTH TAPE MEASURE SYSTEM

CROSS-REFERENCE TO RELATED APPLICATIONS

The present application derives priority from U.S. Provisional Patent Application Ser. No. 62/034,225 filed Aug. 7, 2014.

BACKGROUND. BP THE INVENTION

1. Field of the Invention

The present invention relates generally to measuring physical dimensions on home and industrial construction projects, and more specifically, to a measuring system comprising a Bluetooth-enabled measuring tape in communication with a remote computing device running a software application for making, recording, transmitting, calculating and remotely prompting and guiding further measurements taken by a user with the bluetooth-enabled measuring tape, thereby making project measurements more convenient and error-free.

2. Description of the Background

Conventional tape measures comprise a coiled cloth or metal strip with linear-measurement markings. The flexibility allows for a measure of significant length to be easily carried in one's pocket or tool box, and it also permits measurement around curves or corners. However, a substantial amount of time is consumed during the measurement process using tape measures, and the process is inherently prone to memory lapses and transcription errors. The capture of each measurement taken by the user using the conventional tape measure requires the user to put the tape measure down and walk away from, or at least to take his or her eyes off of the element being measured, to write the measurement on a pad of paper or the like. Unfortunately, in the hectic and noisy environment of a typical construction site, at which conventional tape measures axe most commonly used, scraps or sheets of paper on which measurements are often recorded may be lost, soiled by dirt or liquids on the site, or blown away (i.e., off of unfinished floors of multi-story buildings). Moreover, in order to associate the measurements taken with a conventional tape measure to some meaningful element or dimension on the construction site or project, the user must also record the aspect that the measurement is associated with, which adds additional time to the measurement. And, on a construction, site or even in a user's home, when measurements are taken as part of a home improvement project, a large number of measurements may need to be taken such that the user must be ever more detailed in his or her description of the associated structural element in order to be able to properly recall which recorded measurement goes with which actual dimension (i.e., south-facing wall, east-facing wall, height including molding or height without molding, etc.). To prevent the loss of conventionally-recorded measurements and to save time, some users of conventional tape measures bypass this step of recording by trying to memorize the measurements they take, which also invites significant human error even when a user is well organized. This especially comes into play when a user wishes to measure a space, fixture, piece of furniture, etc. hours or days before the element is installed, such as when a user measures ingress/egress dimensions of his or her home or dimensions of a room prior to traveling to a store to purchase a piece of furniture for that room. A user may also be required to memorize or otherwise record the physical elements for which he or she needs to collect dimensions, and therefore may waste time by measuring incorrect or additional elements.

These drawbacks associated with a conventional tape measure are especially true in an intense environment such as a busy construction site or shop floor, where the user may become distracted by noise, other workers, or the need to move out of the way of a piece of equipment during a measuring project and lose track of his or her place. Additional drawbacks of using a conventional tape measure are specifically associated with home improvement projects or other detail-oriented construction or renovation projects. In addition to risking a failure to properly record or associate taken measurements with a specific aspect of a room, the typical do-it-yourselfer either measures wrongly, makes incorrect calculations based on taken measurements, or altogether foregoes measuring due to the time and complexity that the conventional tape measure, calculator, pen and paper method adds to even a simple home improvement project. The result is often an off-centered or otherwise improperly placed fixture and/or permanent holes or other damage to the structure of the home that cannot be easily moved or repaired.

Prior art solutions to the above-stated problems have addressed some, but not all, of these drawbacks. For example, U.S. Pat. No. 8,356,419 to Lord discloses a digital measuring device that takes measurements using a thin wire with a series of removable heads. The set of interchangeable heads and digital functionality of the Lord device allows the user to retain flexibility to measure a variety of structural elements but also adds time to the measuring process as the user must select and install one of the available heads for each application of the device. In some embodiments, the Lord system transmits taken measurements to a remote device, but does not automatically associate any taken measurement to a specific structural element.

Other techniques envisioned by the prior art for associating measurements taken by a digital measuring device with the actual element being measured include user voice recording (as in United States Patent Application No. 20090307920 to Schrage) or capturing user handwriting on an erasable writing tablet (as in U.S. Pat. No. 7,992,317 to Cannata). Like in the case of the Lord device, the user is required to take additional, time consuming and error-prone steps to re-associate the recorded measurements with the measured elements on a floor plan or the like.

Thus, there is a long-standing and yet unmet need in the prior art to facilitate the recording, retention and proper association of measurement information so that such information can be accurately accessed in the future. There is also a long-standing and yet unmet need in the prior art for a mobile or desktop application that can anticipate the measurements needed and guide the user through the process of taking the proper measurements based on a stated project or objective without the user needing to step away from the element being measured or to take his or her hands away from the measuring device.

BRIEF DESCRIPTION OF THE DRAWINGS

In the drawings:

FIG. 1*a* is a side view of the tape measure device according to the present invention.

FIG. 1*b* is a top view of the tape measure device according to the present invention.

FIG. 7 is a screen shot of a software application according to the present invention showing that the user has chosen a picture hanging project.

FIG. 8 is a screen shot of a software application according to the present invention after the user has selected the "Center" option and instructing the user to position the picture and requesting certain inputs.

FIG. 14 is a screen shot of a software application according to the present invention instructing the user to make a measurement and a mark on the wall.

FIG. 15 is a screen shot of a software application according to the present invention instructing the user to make a measurement and a mark on the wall.

FIG. 16 is a screen shot of a software application according to the present invention instructing the user to hang a picture.

SUMMARY OP THE INVENTION

These and other objects are accomplished herein by a tape measure with retractable tape that stores each measurement, transmits the measurement to a computing device for automatic recordation and association with the object of the measurement, and a software solution at the computing device capable of planning necessary measurements, receiving transmitted measurements from the tape measure, and automatically associating received measurements with an architectural plan. The inventive measuring system comprises a Bluetooth-enabled measuring tape in communication with a computing device running a software application for making precise measurements on home and industrial construction projects. The software is best suited for a tablet or PDA, though any computing device capable of Bluetooth communication, storage and processing of measurements will suffice. In one embodiment, the user simply enters a target object to be measured at the remote computer. The remote computer initiates communication with the Bluetooth-enabled tape measure and choreographs a measurement sequence by the user, prompting the user to complete the measurement sequence via visual prompts displayed on the Bluetooth-enabled tape measure, such as dimensions (Height, Width, etc.) to be measured. Completed measurements are communicated back to the remote computer and are stored in association with a previously entered floor plan and/or object of the measurement. The software solution of the remote computing device receives transmitted measurements from the tape measure, automatically associates the received measurements with the object or architectural plan to be measured, makes necessary calculations and plans and directs subsequent measurements. The Bluetooth-enabled tape measure comprises a standard measuring tape form factor with an auto-sensing circuit, which actively reads the length of tape deployed as tape is pulled from the measure. With tape deployed for a measurement the user depresses a "measure" switch to cause the circuit to record the length measurement. This length of tape deployed is read and displayed as the tape is pulled from the measure, and the measurement is automatically transmitted back to the computing device where it is associated with the specified dimension. In another embodiment, the system directs the user to make certain measurements based on a user-stated project (such as hanging a picture) wherein the system determines the minimum required measurements needed to complete the project and undertakes the calculations necessary to guide the user to complete the project. The system may operate in a hands-free fashion by prompting the user audibly to undertake measurements and other tasks through a Bluetooth-enabled headset.

Other objects, features, and advantages of the present invention will become more apparent from the following detailed description of the preferred embodiment, and certain modifications thereof.

DETAILED DESCRIPTION OF THE PREFERRED EMBODIMENTS

The present invention is a Bluetooth-enabled tape measuring system, a cooperating mobile or desktop application, and a method for using same.

Figure 2:
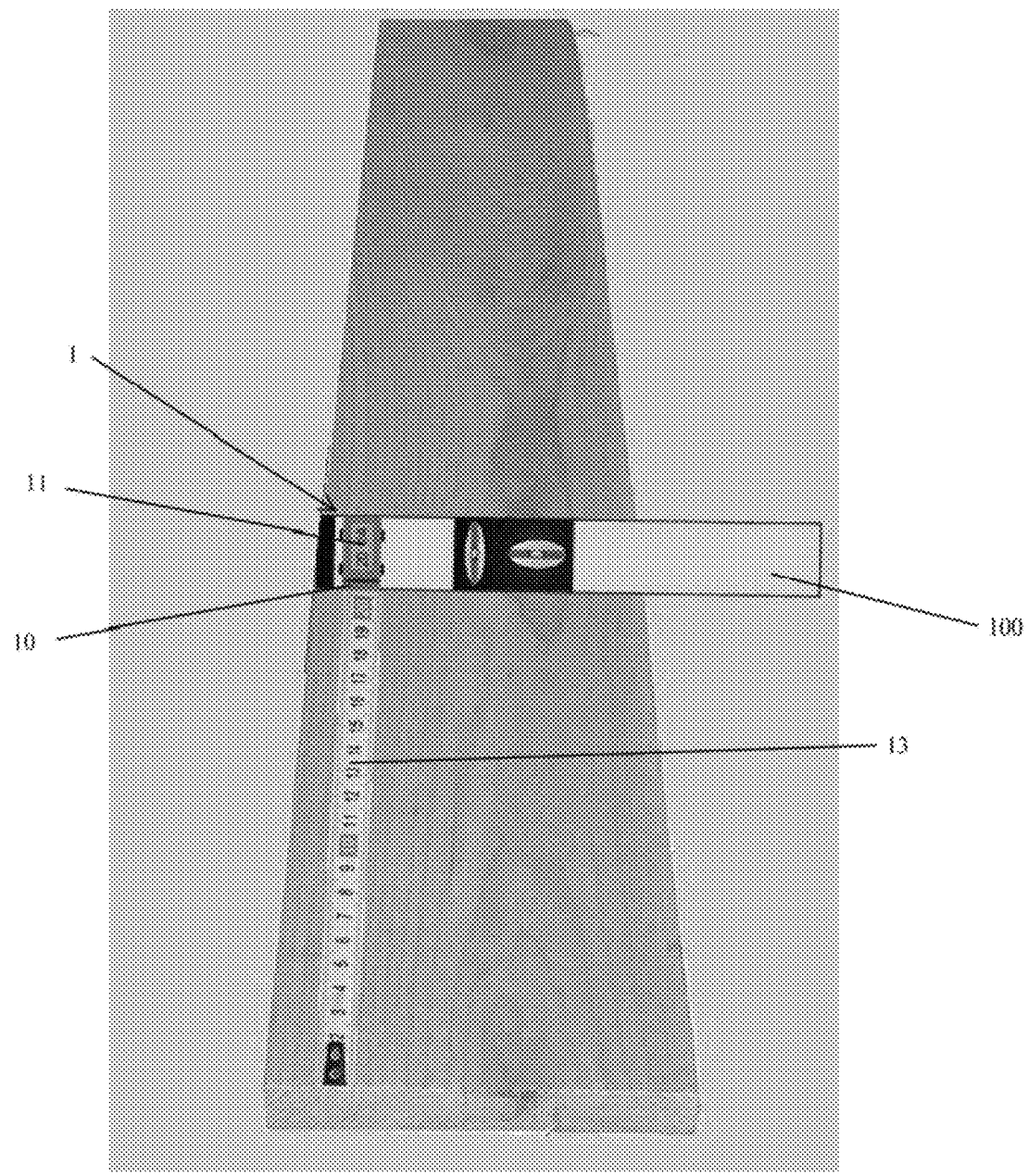
FIG. 2 is a perspective view of the tape measure device according to the present invention as applied to a carpentry tool, here a combination leveling tool/straight-edge/T-square, from the top.

FIGS. 1a and 1b show simplified side and top representations, respectively, of the tape measuring device I according to the present invention, also shown in FIG. 2 with its measuring tape 13 extended to take a measurement. As shown therein, the tape measure device 1 comprises an outer housing 10 capable of housing both the measuring tape 13 and the electrical components associated with the auto-sensing circuitry for determining tape extraction distance, a microprocessor comprising software for calculating measured distance and for performing the other aspects of the inventive system as described in more detail below, a Bluetooth or other wireless communications device for allowing the tape measure device to communicate with a handheld phone, tablet, or other computing device as further described below, screen 11 and the electrical components associated therewith, and a battery (preferably a primary lithium battery, not shown) to power the electric components of the tape measure device 1.

Housing 10 is a hard plastic housing of about 10 cm by 10 cm by 2.5 cm. Along the bottom edge of housing 10 is a short extension 12 that serves as a stop for the tape 13. Extension 12 extends about 1 cm past the main portion of housing 10, i.e. the enclosure where the tape 13 exits. When the tape 13 is coiled into the enclosure a tab 14 connected to the distal end of tape 13 will rest against this extension 12 to prevent tape 13 from recoiling entirely into the housing 10 as shown in FIG. 1a. Extension 12 further ensures the accuracy of any measurements taken with the device 1 by allowing the user to easily align tab 14 with the beginning location of the measurement and the tip of extension 12 with the end location of the measurement. Tab 14 is preferably a "true-zero" hook to allow accurate measurements to be made with the device 1. As known in the art a "true-zero" hook ensures accurate measurements by accounting for its own thickness, which is known by the processor of device 1, as will be described. Accordingly, when the distal end of tape 13 is pushed up against a surface to make a measurement, such as an adjacent wall, when the user desires to measure the full length of a target wall all the way into the corner, the thickness of tab 14 is included in the measurement and this thickness is accounted for by device 1 when sensing, displaying, recording and transmitting the measurement. When tape 13 is used to take an outside measurement, such as when tab 14 is hooked onto the edge of a surface, such as a piece of furniture, tab 14 moves away from the distal end of tape 13 a distance equal to the thickness of tab 14 to allow the thickness of tab 14 to be included in the taken measurement. This movement is accommodated by means known in the art, which generally include a slot and peg attachment mechanism on the distal end of tape 13 that allows tab 14 to slide the predetermined distance longitudinally relative to the distal end of tape 13.

From a basic mechanical standpoint, tape measuring device functions similarly to a conventional tape measure; that is, prior to use, the length of retractable tape 13, which may be anywhere between 15 and 100 or more feet in length and approximately ½ to 1½ inches wide, is coiled around a spooling device inside housing 10 of tape measure device 1. The spooling device (not shown) is spring-loaded or uses some other method known in the art to retract tape 13 from an extended position and coil it around an interior spool extending from interior side to interior side at a midpoint of housing 10. Tape 13 enters and leaves housing 10 during coiling and uncoiling through an opening (not shown) from extension 12 in the front of housing 10 which has a width and height sufficient to accommodate a lateral cross-sectional area of tape 13 but not tab 14 attached to the distal end of tape 13 which, as described above, serves as a stop measure to prevent tape 13 from being pulled entirely into the measuring device housing 10. Tab 14 also serves as a gripping point for the user in pulling tape 13 out of housing 10 for purposes of taking a measurement and a clipping or grasping surface that the user may use to attach the distal end of tape 13 to a surface at one end of a measurement to be taken. The spooling device may additionally comprise a locking mechanism (not shown) actuated by a slide-button 17 mounted external to housing 10 that prevents movement of the tape into, or out of housing 10 while partially or fully extended as known in the art. Housing 10 may also contain a clip, cord (not shown), or other means for attaching the tape measure device 1 to the wrist, belt loop, toolbox, etc, of the user. Housing 10 also includes a Menu button 16 and a Measure/Select Button 18 as will be described, which control the electrical components of the tape measure device 1.

Tape 13 may be composed of cloth, plastic, metal, fiberglass, or like material that is capable of coiling around an inner spooling mechanism and durable enough to be spooled and unspooled repeatedly. Preferably, the tape measure is made from a thin-sheet of steel or aluminum metal and has a slightly convex cross section, to make the tape 13 more rigid across longer distances and to facilitate recoiling of same around the inner spooling mechanism in housing 10. Most preferably, tape 13 is a standard five-meters metal tape. Also in the preferred embodiment, tape 13 is marked in a contrasting color (as compared to the color of tape 13 itself) with, both metric and English units of measure in units of feet, inches, and 1/16" (English) or meters, centimeters, and millimeters (metric), wherein English units of measure appear along the length of tape 13 on one lateral edge and metric units of measure appear on the other lateral edge. However, tape 13 may not contain any markings or may contain markings in different, unit denominations or according to any other system of measurement.

To use a conventional tape measure, the user pulls the distal end of the tape to extract the tape from the tape measure housing, aligns the tape with the dimension that he or she wishes to measure with the distal end of the tape at one end, reads the measurement corresponding to the other end of the desired dimension from the tape, and records the measurement by writing it on a piece of paper or by other means as described above with reference to the prior art. In the instant invention, however, the desired distance is measured and recorded by the microprocessor inside tape measure housing 10 and then displayed on screen 11 on the top of the tape measure device housing 10.

The Measurement/Select button 18 will turn the unit on and off, and is used for taking measurements and is placed for easy thumb use. When the unit 1 is off, a single press of Measurement/Select button 18 for one second will turn the unit on. A press of two seconds will turn the unit off. Ten minutes of idle time will also automatically turn the unit off. The Menu button 16 is used for setup. The Menu button 16 is smaller and displaced from the Measure button 18 to avoid accidental depression of the Menu button 16 when the user desires to take a measurement. Additional functionality of the Menu button 16 can include selection of inside or outside measurement or selection of measurement units to be displayed on display 11 or transmitted to a connected device.

The display screen 11 may be a monochrome LCD dot-matrix display, or an LED screen or the like that is capable of clearly displaying characters on a thin flat surface. The microprocessor according to the present, invention includes an internal memory device to store the measurement data inside the tape measure device 1. When initially turned on the unit 1 will search for a Bluetooth device to connect to, and the display will show "Searching for Device . . . " during this time. If a device is found and successfully connected, the display will show Connected for one second followed by either two lines of text associated with the two buttons (see below) or a measurement prompt as directed by the Smartphone/Tablet software application, as further described below. Where no remote device is found and/or where a remote device is not successfully connected to device 1, display 11 may show "No Device Found." As shown in FIG. 1, display screen 11 is positioned to the right of both the Menu button 16 and the Measure button 18, which are "stacked" roughly on top of each other, on the outer side surface of housing 10 proximate extension 12. The screen 11 can thus have a means of showing text associated with one or the other, or both, of the Menu 16 and Measure 18 buttons as described in more detail below.

When the tape 13 is pulled, the display 11 will show a large "M" next to the Measure button indicating its use and the rest of the display 11 will be used to show the current measurement. Upon depression of the Measurement/Select button 18, the measure indicator "M" will be replaced with blinking right-facing arrow indicating communication to the remote computer software (if available). When sent successfully the arrow will be replaced by "Sent" and the measurement value will be stored. Any subsequent movement of the tape 13 will cause the display 11 to revert back to the measure indicator "M" and progressing measurement value.

In an alternate mode of use, device 1 can be used to receive a desired measurement, from a remote device and then to prompt the user to use the device to take the desired measurement. In this mode, when the unit 1 receives a measurement value, the display 11 will blink the received measurement until the tape 13 is moved. Upon movement of the tape, i.e. when the user proceeds to take the requested measurement with the device, the display 11 then changes to a "Find the measure" mode in which, for example, the measure indicator "M" is displayed along with a text prompt method to assist the user to find the desired measure location.

By way of example, a measure assist prompt may comprise an arrow-type indicator depicted on display 11 as follows: <<<<|>>>>. Initially the display 11 may start with "|>>>>" to prompt the user to pull the tape 13 from housing 10, but as the tape is pulled the display would progress to "|>>>", "|>>", "|>" and finally "|" when the tape has been pulled to the desired length of the measurement. This arrow progression might, roughly, change at 50%, 75%, and 90% of the desired measurement (corresponding to each phase of the arrow diagram). When pulled too far, the display may show "<|" to indicate that the tape has been pulled too far, with additional "<" characters to indicate how far past the desired measurement the tape has been pulled.

When the precise output location is determined the user simply marks the spot at the distal end of tape 13 or at stop 12, depending on which end the user has anchored in order to make the measurement. The Measurement/Select button 18 is depressed again to tell the remote computer software to proceed to the next task.

Under the remote device-prompted functionality, the remote computer choreographs the measurement sequence based on the user's selection of an object or project type to be measured, and the user completes the measurement sequence using unit 1 via visual prompts displayed on the unit 1 display 11. Thus, for example, the user may be directed to measure and record an outside dimensions of a structure or element, such as the width of a standalone support beam or the length of a sofa, etc. Thus, the display 11 prompts the user to deploy tape 13 along the desired dimension as described above, at which point the user may press the Measurement/Select button 18 to prompt the tape measure device 1 to record the outside measurement. Next the user may be prompted to measure an "inside" measurement by pressing the tape measure into a corner of a structure or element, such as when the user wishes to measure the entire width of a wall in a square room. The display 11 prompts the user to deploy tape 13 along the desired dimension, at which point the user may press the Measurement/Select button 18 to prompt the tape measure device 1 to record the inside measurement. When necessary, the remote computer software calculates necessary measurements for the completion of a project that the user desires to undertake, as indicated to the remote computing device. For example, the user may be prompted to take an "inside measure" to detect the endpoints of the measurement, and when this measurement is received the remote software may calculate half the entire length of this measurement for placement of a picture hanger, or the like. The sensing and recording of inside and outside measurements is made accurate by the "true-zero" tab 14, as described above. Inside measurements are made more accurate with the inventive tape measure device than with prior art tape measure devices because the device automatically adds the distance from stop 12 to the back of housing 10 to an inside measurement so that the user can simply place tab 14 into one corner of the inside measurement and the back of housing 10 into the other corner of the inside measurement, then press the measure button. Conventional tape measure devices require the user to guess at the distance between the front and back of the tape measure housing, or, even if this distance is known, to manually add this distance to the end of their inside measurement. Alternatively, the user of a conventional tape measure device is required to press the tape back into the inside of the corner being measured, resulting in an even less accurate measurement.

Tape measure device 1 may determine the desired measurement from the physical aspects of the tape 13 and its length of withdraw in a variety of ways. For example, tape measuring device 1 may contain an optic sensor to read unit of measure markings or other optical indicia, visible or invisible to the human eye, present on the tape 13 and indicating its length of withdrawal. Alternatively, tape measuring device 1 may have an orientation sensor, such as a rotary encoder or the like, coupled to its internal spooling system to determine, based on tension of the spring-loaded spool, by orientation or by some other means, the length of tape that has been removed from the spool in determining the length of tape outside of housing 10. Any other means of measurement known in the art for measuring relative position of a spool or extended tape are also envisioned for use with the present invention, including but not limited to the use of magnets along the length of the tape coupled with magnetic sensors inside housing 10 or RF signal transmission and return means along the length of tape 13 coupled with a sensor to convert time of signal travel into a distance measurement. Regardless of the means, the microprocessor of the instant invention calculates the desired measurement and displays it on screen 11.

Figure 3A:
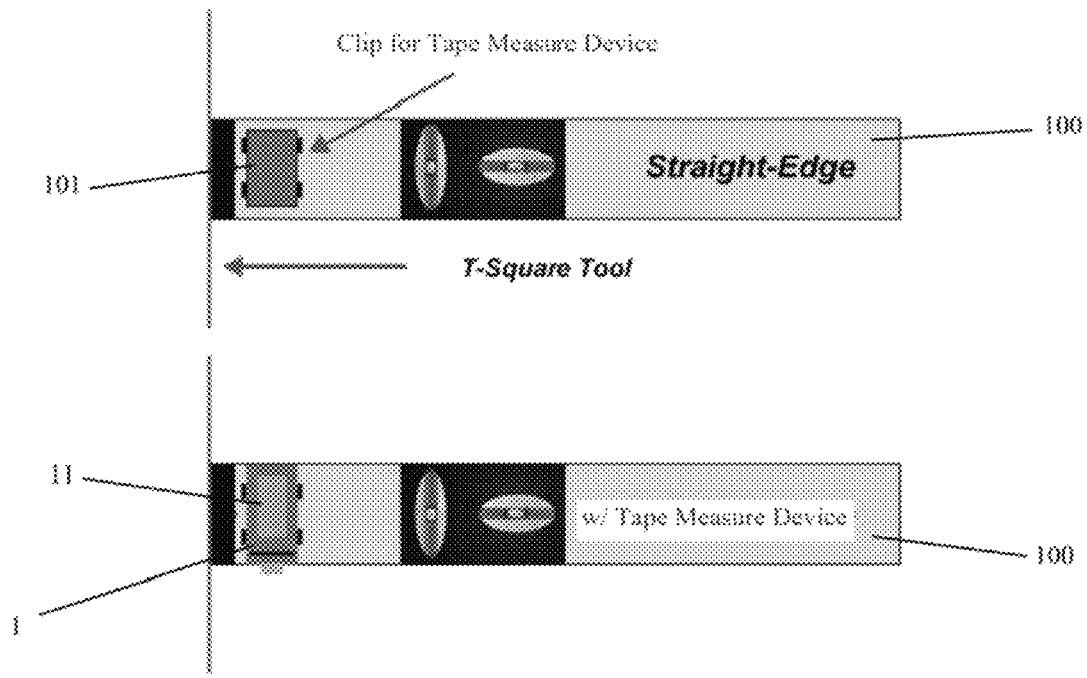
FIG. 3a is a top view of the tape measure device according to the present as applied to the carpentry tool.
Figure 3B:
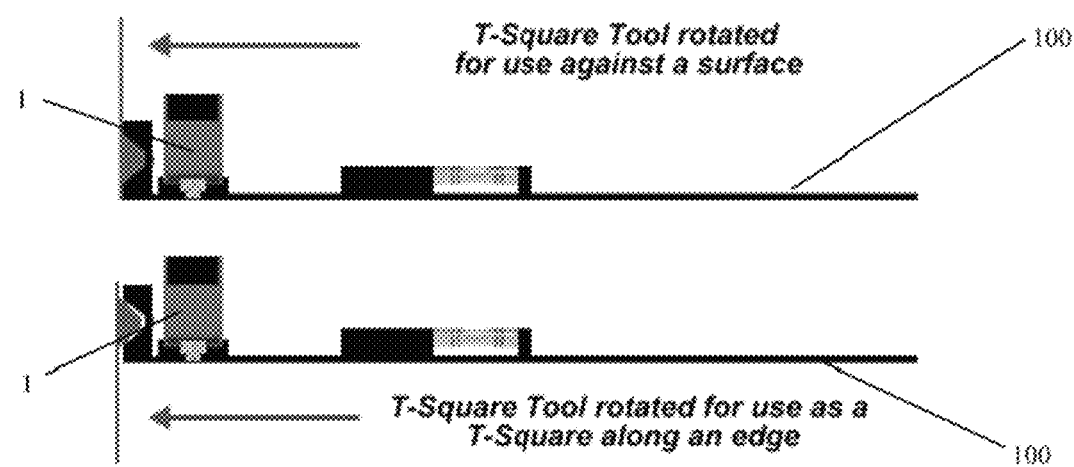
FIG. 3b is a side view of the tape measure device according to the present invention as applied to a carpentry tool.

Other physical functionalities of tape measure device 1 are shown in FIGS. 3a and 3b. For example, tape measure device 1 may be attached to a carpentry tool 100 such as a straight edge, T-square tool, level or the like using a clip 101 that may be integrated into the tool 100 or sold separately and attached thereto with adhesive or the like. The tape measure device may therefore be detachable from the tool for cooperative use therewith. This way, inside and outside measurement tasks are precisely aligned with the respective edges of an object being measured.

Figure 4A:
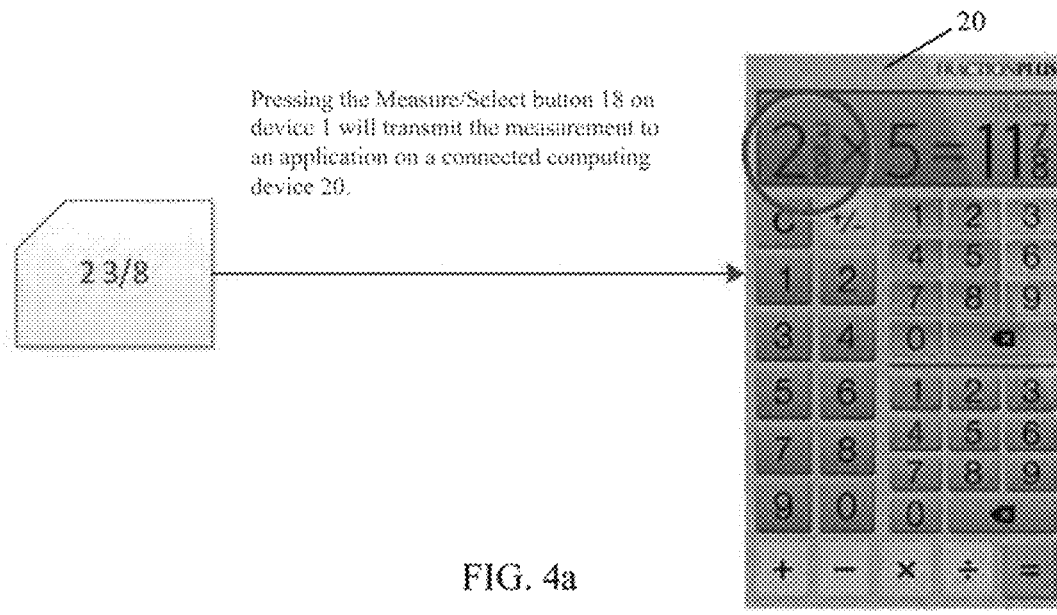
FIG. 4a is a block diagram indicating the interaction of the tape measure device with an application on a computing device and showing transmission of information from the tape measure device to the computing device.
Figure 4B:
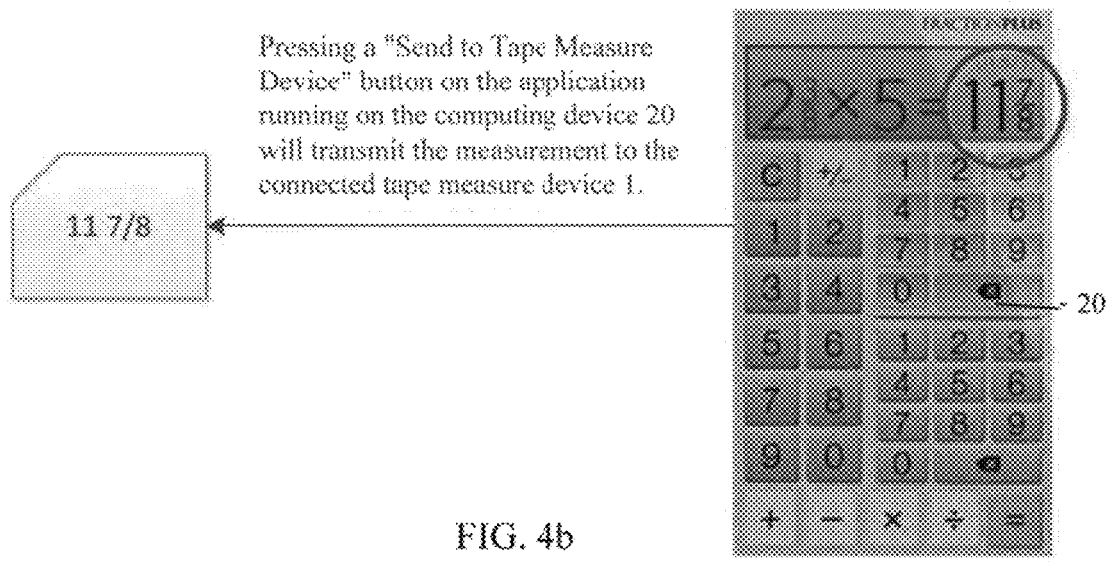
FIG. 4b is a block diagram indicating the Interaction of the tape measure tool with an application on a computing device and showing transmission of information from the computing device to the tape measure device.

The inventive tape measure device 1 further comprises Bluetooth or other wireless capability through which the tape measure device 1 can communicate with a computing device 20, such as a smartphone, as shown generally in FIGS. 4a-4b. Preferably, unit 1 is equipped with a Bluetooth radio with an internal antenna for communicating with said computing device. Although best suited for interaction with a portable device such as a smartphone, tablet, or PDA, any computing device such as a laptop or desktop computer will suffice. The interaction between the tape measure device 1 and computing device 20 may take one of several forms. As previously described, device 1 may both send taken measurements and receive desired measurements from computing device 20, which may be facilitated by an application run on computing device 20, as further described below. The application run by computing device 20 may also be enabled to utilize display 11 of the device 1 for more detailed prompting of a user using device 1 by the application.

With reference to FIGS. 4a-4b, in the most basic embodiment, the tape measure device 1 communicates with computing device 20 over a Bluetooth transceiver to transmit measurements back and forth from tape measure 1 to computing device 20 and vice versa. As shown in FIG. 4a, computing device 20 may run an application that includes a fractional calculator or other application that allows input of numbers including fractions or a sufficient number of decimals. FIGS. 4a-4b show the use of the tape measure device 1 with the mobile application Fraction Calculator Plus Free. Upon withdrawing tape 13 to a sufficient length to measure a chosen dimension, the user would then press one the Measure/Select button 18 on the side of the tape measure device 1 which would cause the tape measure device 1 to transmit the measurement in numeric format via Bluetooth or other wireless means to the connected computing device 20 for display in and vise by the mobile application. Thus, as shown, the user may record the measurement with the application or perform a desired calculation with the measurement, such as determining the length of material necessary for live 2⅜ foot sections to be constructed out of that material.

FIG. 4b shows the functionality of the instant invention in transmitting measurements from a computing device 20 to the tape measure device 1. For example, if the user wishes to hang five pictures side-by-side, each measuring 2⅜ feet wide (which measurement may have been transmitted from the tape measure device 1 to the computing device mobile application as described above), the mobile application may determine that 2⅜ times 5 is 11⅞ feet wide. The application on computing device 20 may then have an option to "Send to Tape Measure Device" or the like, preferably incorporated into a virtual "button" on the application and optionally containing trademark or branding information for the tape measure device 1. When the user gives this command to the application, the application will send the selected measurement in numeric format over a Bluetooth or other wireless network. Upon receiving such a measurement from a computing device 20, the tape measure device may store and/or display the received measurement on screen 11. The user may indicate to the computing device 20 that the measurement has been taken by pressing the Measure/Select button 18, after which the taken measurement may be transmitted from the tape measure device 1 back to the computing device 20. In either one of these scenarios, both the application on computing device 20 and the microprocessor in tape measure device 1 may have a mechanism for constant or periodic scanning over a Bluetooth or wireless network to search, for and receive data from the connected device.

Figure 5:
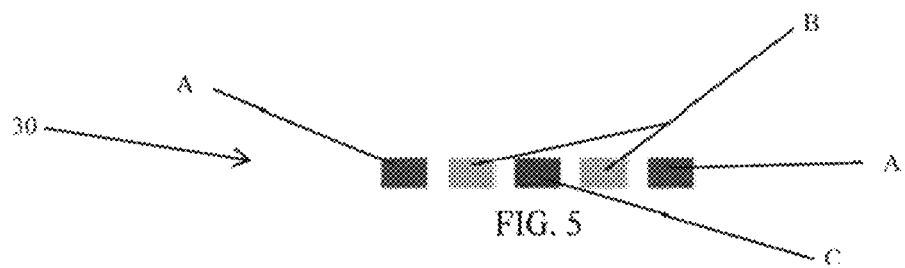
FIG. 5 is a representation of the indicator lights on the tape measure device according to the present invention.

As an alternative to arrow indicators on display 11, tape measure device 1 may have a series of LED light indicators to guide the user in taking a desired measurement, i.e. one that has been sent to the tape measure device 1 from a computing device 20. This may be in the form of a series of LED lights on the casing 10 of tape measure device 1. In a preferred embodiment, the guide consists of five LED lights 30 as shown in FIG. 5, where reference characters A may indicate a red LED light, reference characters B may indicate a yellow/orange LED light, and reference character C may indicate a green LED light. When a measurement is received by the tape measure device 1, all five of the lights A, A, B, B and C will blink to alter alert the user of same. Once the user pulls tape 13 from housing 10, the lights 30 will guide the user to the proper position and indicate when the proper location has been reached based on the received measurement. The left-most red LED A will indicate that the desired length is longer than the tape is pulled. The left yellow LED B will light when the measurement is longer than the tape is pulled too short but close, wherein the predetermined "closeness" indicator may be determined based on design preference or accuracy requirements for the tape measure device 1. The green LED C will light when the proper length is achieved. The right red and yellow LEDs A, B will operate similarly but for a length that is longer than the desired measurement.

Figure 6A:
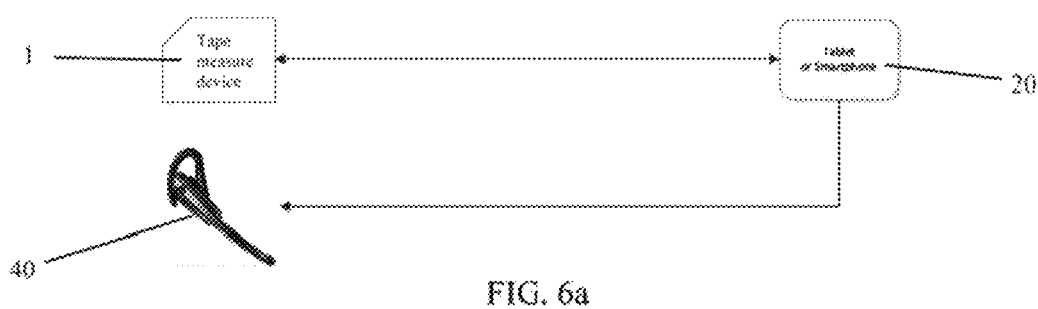
FIG. 6a is a block diagram indicating the interaction of the tape measure tool with a computing device and a Bluetooth or wireless headset.
Figure 6B:
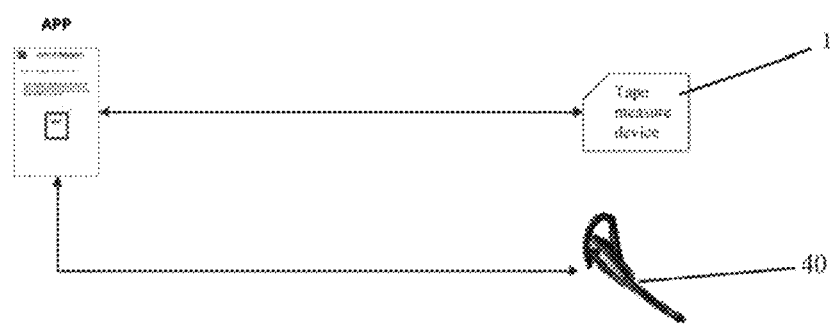
FIG. 6b is a block diagram indicating the interaction of the tape measure tool with an application on a computing device and a Bluetooth or wireless headset.
Figure 6C:
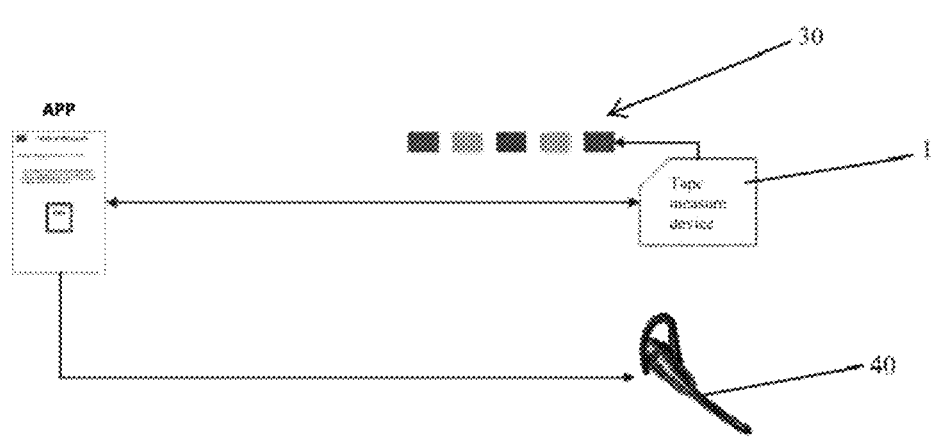
FIG. 6c is a block diagram indicating the interaction of the tape measure tool with an application on a computing device and a Bluetooth or wireless headset, including a depiction of the indicator lights.

Tape measure device 1 and computing device 20, preferably through an application running thereon, may also advantageously prompt the user with audio commands through a Bluetooth or wireless-enabled headset. FIGS. 6a through 6c are a diagram of the various connections between tape measure device 1 and computing device 20 or an application running on computing device 20. As shown therein, computing device 20 and/or the application running thereon may be connected directly to both tape measure device 1 and to a wireless or Bluetooth headset 40 by separate Bluetooth or wireless connection. Thus, when the application requires or has as an output a desired measurement, it may transmit that measurement both visually to tape measure device 1 and in audio format to headset 40 such that the measurement may simultaneously show up on display 11 on tape measure device 1 and be stated to the user through the headset (i.e., "measure the window opening at the bottom"). Computing device 20 may cause an electronic or written command within the device or application to be converted to an audio signal using one of several means known in the art. This functionality may also be used with more complex versions of a mobile application, such as those described below, to simultaneously transmit written commands to tape measure device 1 and audio commands to headset 40. As before, the Measure/Select button 18, or another optional button on housing 10, may indicate to computing device 20 that the requested measurement or step has been taken and transmit any measurement data from tape measure device 1 back to computing device 20.

The instant invention envisions that the tape measure device disclosed herein will be accompanied by one or more software applications, to be run on a computing device 20, to accomplish tasks such as the measurement and command transmission and receipt between the devices as described above. In a preferred embodiment, the software may also include guides for assisting the user in additional home improvement or construction projects requiring the measurement of some physical aspect.

Figure 17:
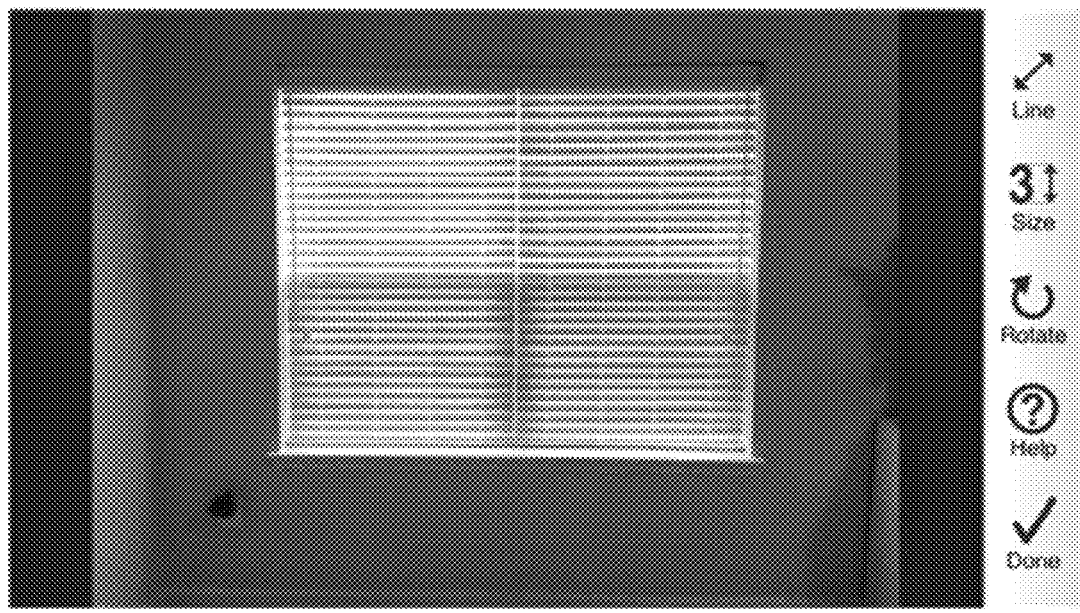
FIG. 17 is a screen shot of a software application for use with another embodiment of the preferred invention wherein the user has taken a picture of an existing space to be measured.
Figure 18:
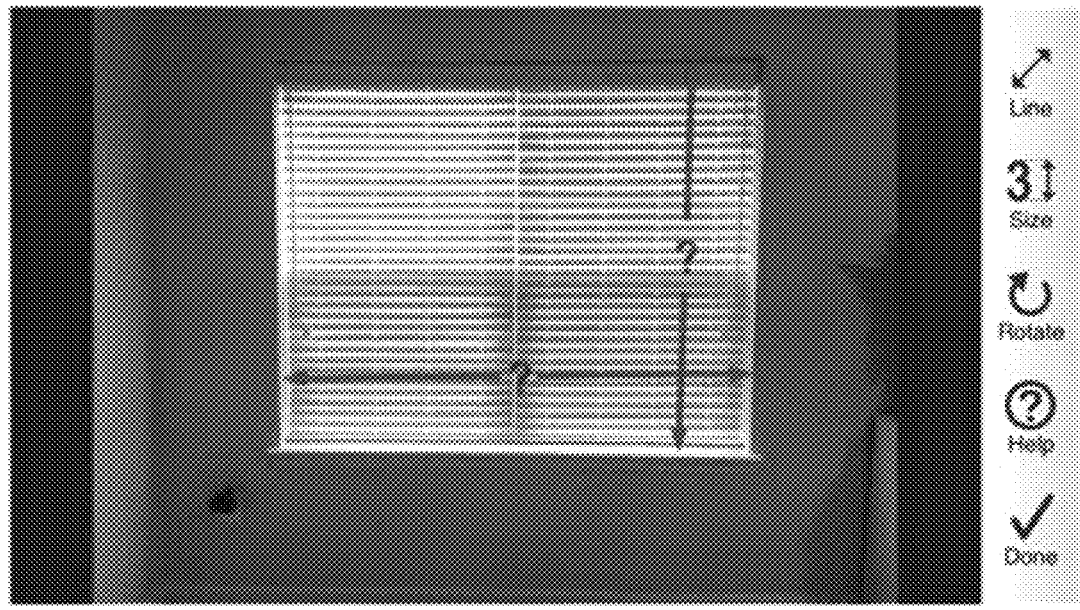
FIG. 18 is a screen shot of a software application for use with another embodiment of the preferred invention wherein the user has applied lines on a picture of an existing space to indicate specific dimensions to be measured.
Figure 19:
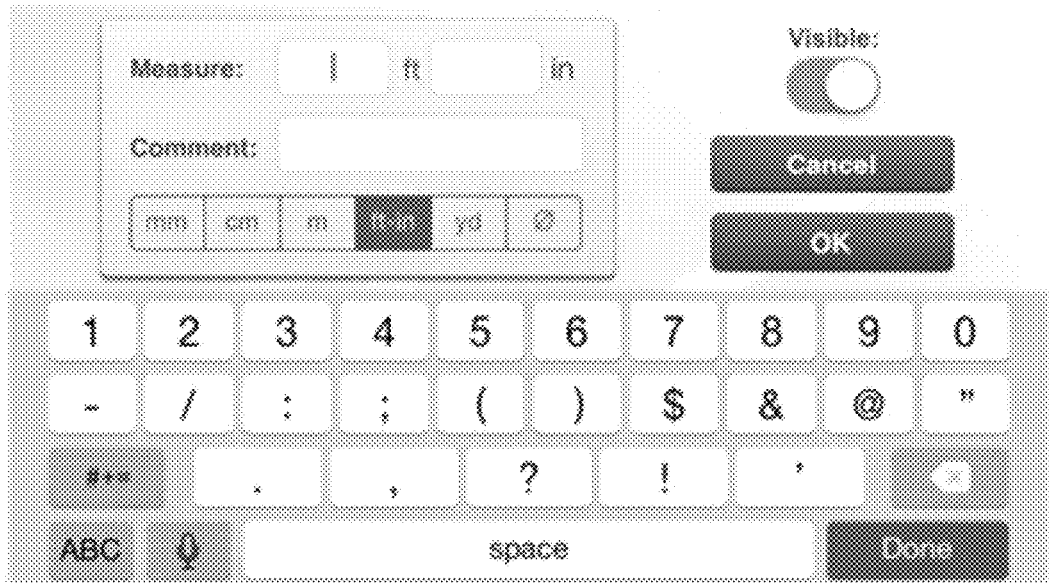
FIG. 19 is a screen shot of a software application for use with another embodiment of the preferred invention wherein the user has selected one of the dimensions on a picture of an existing space to be measured.
Figure 20:
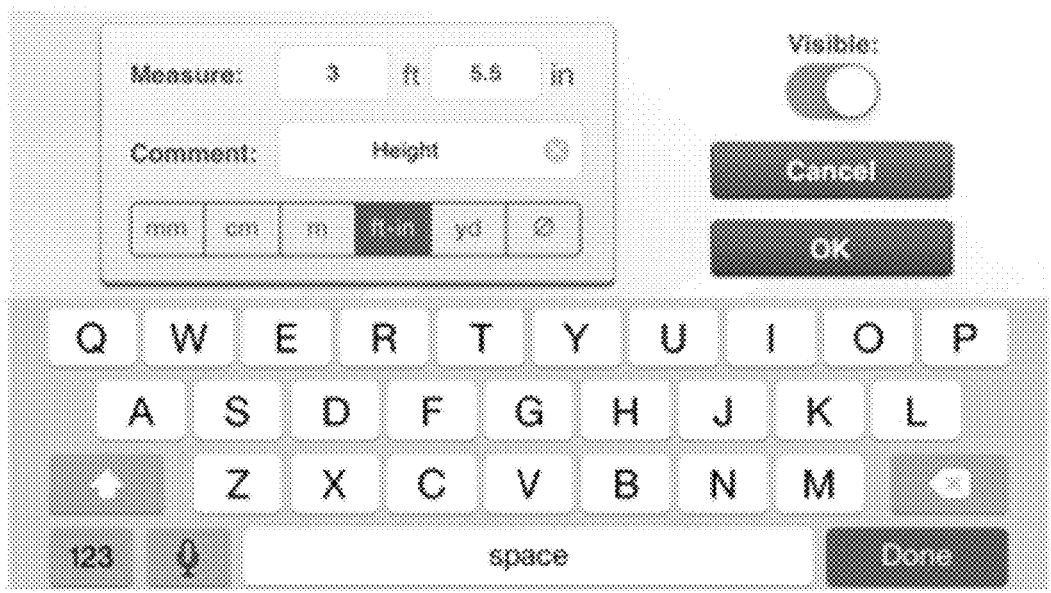
FIG. 20 is a screen shot of a software application for use with another embodiment of the preferred invention showing input received by the software application from the tape measure device.

With specific reference to FIGS. 17-20, in one embodiment of the invention, the software is run on a tablet or smartphone device having a digital camera and means of displaying the picture taken incorporated therein. More preferably, the computing device 20 has a touch screen. According to this embodiment, the software on computing device 20 guides the user to take a picture of a space, architectural drawing, or floor plan to be measured, or, alternatively, to import such a photo from the user's gallery or other storage area on the device. Potential software applications to be used for this purpose include the My Measures and Dimensions and the Photo Measures mobile applications. FIG. 17 shows a screen shot of the software application wherein the user has taken a picture of a space to be measured, i.e., a window. When the user indicates that a satisfactory picture has been taken, the software then causes the picture to be displayed on the device's touch screen and the user may instructs the user to draw lines on the photo to specify dimensions (i.e. height, width) to be measured on the elements in the photo. FIG. 18 shows a screen shot of the software application, including tools on the right side that the user can use to draw lines on the photo, wherein the user has drawn lines to indicate that he or she wants to measure the height and width of the pictured object, in this case the window. When the user has identified some or all of the dimensions to be measured, the software sends commands to the tape measure device 1 and headset 40 instructing the user to measure the requested parameters (i.e., "measure the height of the east-facing wall"). These commands may be given to the user visually on screen 11 and in audio format over headset 40 as described above. Alternatively, the user may determine the order of measurements to be taken by, i.e., pressing the "?" symbol associated with one of the lines that he or she has drawn on the image to indicate desired measurements. When either the user or the software application selects a dimension to be measured, the software application may show a measurement input screen as shown in FIG. 19. When the user completes the measurement, he or she presses one of the "measure" buttons on tape measure device 1 to indicate that tape measure device 1 should take either an inside or outside measurement of the area over which tape 13 is drawn. Tape measure device then records the taken measurement, displays it on screen 11, optionally stores it on a memory device within tape measure device 1, and transmits it over the wireless or Bluetooth network back to computing device 20, where the software running thereon associates it directly with the indicated measurement on the image taken or imported by the user in real time. A screen shot of the software application showing capture of the taken measurement by the software application and association of same with a particular dimension to be measured is shown in FIG. 20. The software then continues to direct the user to take the measurements indicated on the photo and to associate the taken measurements with the photo until all requested measurements have been taken. The user may then identify additional measurements to be taken by indicating elements to be measured on the photo or may conclude the project and have the software either save or export measurements associated therewith alone or in conjunction with the floor plan. The user may also take additional measurements not indicated on the drawing which the software may add as an appendix thereto for later use or association by the user. The software may additionally allow the user to make notes or add other indicia on or as an attachment to the image or the project as a whole through the computing device 20 (shown in FIG. 20). This software and method of using same completely eliminates the possibility that recorded and/or transmitted measurements will be lost, misunderstood or associated with another physical element that the user has measured as part of that same or a different project, which is especially important in the case where the user takes several measurements of comparable dimensions. The user may then direct the software to save the image and its associated measurements, such as when the user has measured the dimensions of a room and then takes the image of same and associated measurements on his or her smartphone to a furniture store to buy furniture for the room, or to export this data to another software application or for sending to another user via email or the like. This application of the software disclosed herein may also be advantageously used on a construction site where a supervisor uses his or her wireless or Bluetooth-enabled computing device to indicate measurements to be taken on a set of architectural drawings, the software transmits the measurement requests to a contractor elsewhere on the job site proximate the place where the measurements are to be taken and in possession of the tape measure device 1, and the supervisor can observe the measurements being taken and applied to the drawings in real time, as the contractor takes them with tape measure device 1, via the software on computing device 20.

Another embodiment of the software component of the instant invention is described with reference to FIGS. 7-16. As described above, the software in conjunction with tape measure device 1 is capable of guiding the user through a home improvement or construction project that involves a measuring aspect. This aspect of the invention is now described with reference to the project of hanging a picture or a mirror, where software to guide the user is run on the user's smart phone device, but it should be understood that the software may be programmed to assist the user with any number of simple or complex home improvement or construction projects, whether or not they involve a measuring aspect.

The software will direct the user to select from one of several home improvement or construction projects. As shown in FIG. 7, the user has selected the project of hanging a mirror as viewed in a screenshot of the software application on the user's smart phone. The software indicates that the selected project will guide the user through the steps required to determine where to place two picture hangers for hanging the user's desired picture or mirror. As shown in FIGS. 8-16, the interactive software then guides the user through the steps of hanging a picture, wherein each step may involve an audio command to the user's headset 40, The headset may also engage in two-way communication with the computing device 20, such that pressing a button on the headset 40 may replay the last instruction to the user through headset 40. If a measurement is required in a given step, the user may take the measurement using the tape measure device 1, which also may indicate that a measurement is to be taken using screen 11, and indicate that the measurement has been taken by pressing one of the "measure" buttons on housing 10. Optionally, the measurement taken may be played back to the user through headset 40 for confirmation and/or correction by the user (i.e., "your measurement was XX; if this is correct, wind the tape back, and if not, take another measurement). Where a step does not require a measurement, the user may indicate that the step has been completed by pressing one of the "measure" buttons on housing 10. For certain functions, the user may interact directly with the software, as described below. The software may also advantageously include a materials list for the user to utilize in planning a project requiring additional materials.

Figure 9:
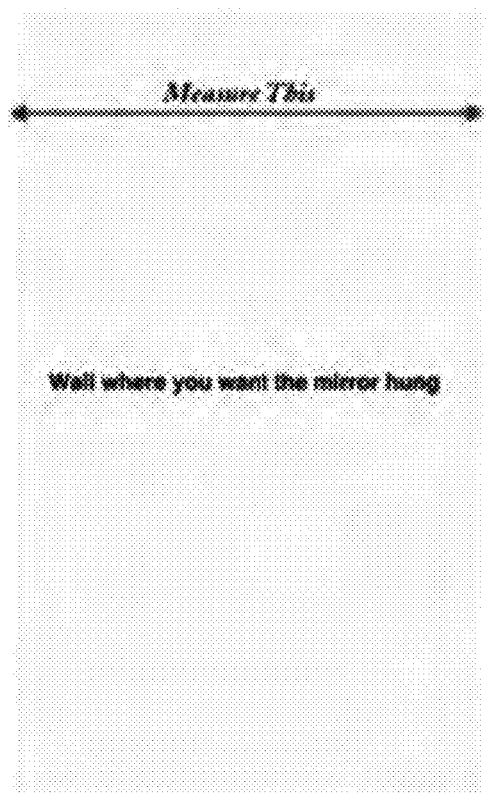
FIG. 9 is a screen shot of a software application according to the present invention instructing the user to measure a wall.
Figure 10:
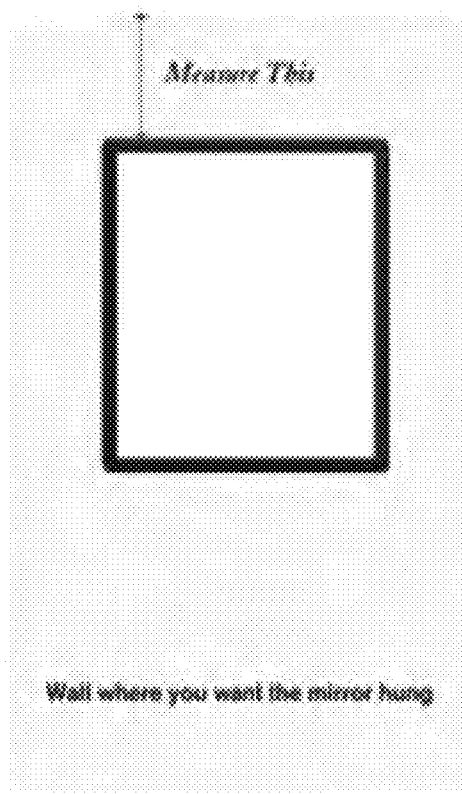
FIG. 10 is a screen shot of a software application according to the present invention instructing the user to measure a distance between a mark and the ceiling.
Figure 11:
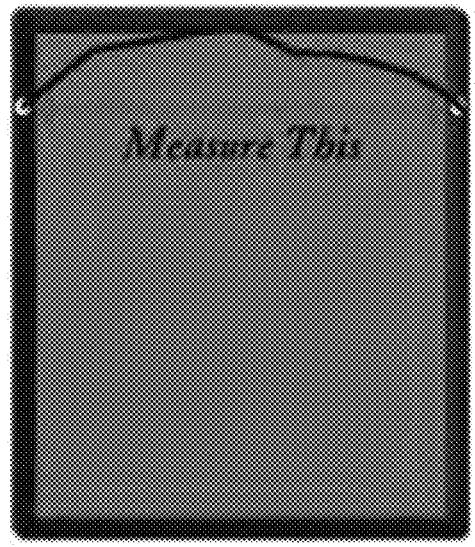
FIG. 11 is a screen shot of a software application according to the present invention instructing the user to measure the distance between, the wire hooks of a picture.
Figure 12:
FIG. 12 is a screen shot of a software application according to the present invention instructing the user to measure the length of an aspect of the hanging wire.
Figure 13:
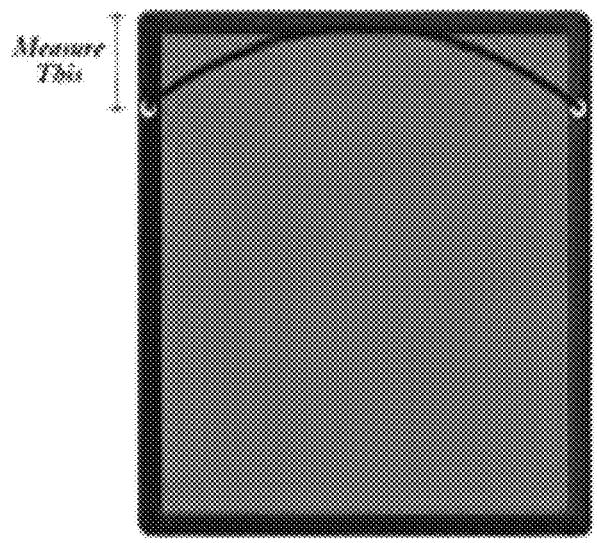
FIG. 13 is a screen shot of a software application according to the present invention instructing the user to measure the distance between the picture hanging hooks and the top of the picture.

FIG. 8 shows a screen shot of the software wherein the user is instructed via the software and/or headset 40 to position the picture and make a mark at its top right corner, and to indicate to the software where horizontal measurements to the picture's position should be made with reference to. FIG. 9 shows a screen shot of the software wherein the user is directed to measure the wall where he or she wants the mirror to hang, wherein audio and visual prompts are provided to the user as described above. FIG. 10 shows a screen shot of the software wherein the user is instructed to measure the distance from the ceiling to the mark previously made. FIG. 11 shows a screen shot of the software wherein the user is instructed to measure the distance between the hooks holding the hanging wire. FIG. 12 shows a screen shot of the software wherein the user is instructed to measure the length of the hanging wire with the wire pulled to one side. As in the previous FIGS., the software shows an image on the user's smart phone of how the measurement should be taken. The length of the hanging wire is then calculated by the remote computer 20 software as the sum of the distance between the hangers (previously measured)+((the measurement shown—the distance between the hangers) times 2). FIG. 13 shows a screen shot of the software wherein the user is instructed to measure the distance from the hooks to the top of the picture.

When the software has collected the required measurements to determine where the picture hanging hooks should be placed, it performs internal calculations to determine required placement of same and the measurements that the user must make to locate that position on his or her wall. FIGS. 14 and 15 show screen shots of the software wherein the user is instructed to make the measurements as determined by the software and to mark where the picture hanging hooks should go. During this process, wherein a measurement is sent from the computing device 20 to tape measure device 1, indicator lights may be used as shown in FIGS. 5 and 6c to guide the user in making the correct measurement. Alternately, characters such as "<", as previously described, may be shown on display 11 to guide the user. As shown, the software also provides a roadmap to indicate to the user what point of the project he or she is in and what steps will be done next, and/or what materials need to be used (i.e., "we are now ready to put the hooks in the wall"). Finally, FIG. 16 is a screen shot of the software wherein the user is instructed to install hooks into the wall and hang the mirror. As described above, the user can use a button on headset 40 to initiate audio playback of the last instruction and a button on tape measure device 1 to indicate that the step has been completed.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A system for making, recording, transmitting and associating measurements taken by a user with a physical dimension, comprising:
   a measuring device comprising a housing, a retractable measuring tape, a screen(s) on an exterior of said housing, a microprocessor running software in communication with said screen, and a first wireless connectivity device in communication with said microprocessor; and
   a remote computing device comprising a second wireless connectivity device and a processor running software configured to accept measurements from said measuring device and to associate said measurements with an aspect of an image.

2. A method of making, recording, transmitting and associating measurements taken by a user with an aspect of an image, the method comprising:
   providing a remote computing device;
   importing an image onto said remote computing device;
   indicating on said image, using said remote computing device, a plurality of elements in said image representing a plurality of physical aspects to be measured;
   transmitting, by said remote computing device via a wireless network, an instruction to a tape measure device to measure one of said plurality of physical aspects;
   transmitting, by said remote computing device via a wireless network, an instruction to a wireless headset to measure one of said plurality of physical aspects;
   collecting, using said tape measure device, a measurement for said one of said plurality of physical aspects;
   transmitting, by said tape measure device via said wireless network, said measurement to said remote computing device; and
   associating, by said remote computing device, said measurement with one of said plurality of elements.

* * * * *